(12) United States Patent
Blewett et al.

(10) Patent No.: US 11,071,384 B2
(45) Date of Patent: Jul. 27, 2021

(54) V-SHAPED COUPLING SYSTEM

(71) Applicant: INOVATIV, INC., Irwindale, CA (US)

(72) Inventors: Patrick Timothy Blewett, Altadena, CA (US); Matthew Richard Benich, Montclair, CA (US); Brent John Siebenaler, Rimforest, CA (US)

(73) Assignee: Inovativ, Inc., Irwindale, CA (US)

( * ) Notice: Subject to any disclaimer, the term of this patent is extended or adjusted under 35 U.S.C. 154(b) by 0 days.

(21) Appl. No.: 16/566,867

(22) Filed: Sep. 10, 2019

(65) Prior Publication Data

US 2021/0068542 A1 Mar. 11, 2021

(51) Int. Cl.
*A47B 96/06* (2006.01)
*F16M 13/02* (2006.01)

(52) U.S. Cl.
CPC .......... *A47B 96/068* (2013.01); *A47B 96/061* (2013.01); *A47B 96/066* (2013.01); *F16M 13/022* (2013.01)

(58) Field of Classification Search
CPC .... A47B 96/068; A47B 96/066; A47B 96/061
USPC .......... 248/643, 316.4, 316.6, 229.1, 229.12, 248/229.14, 224.51, 223.41, 224.61
See application file for complete search history.

(56) References Cited

U.S. PATENT DOCUMENTS

| | | | | |
|---|---|---|---|---|
| 4,176,580 A * | 12/1979 | Gallegos | ................... | G10G 5/00 248/224.51 |
| 4,620,736 A * | 11/1986 | Shanks | .................... | B60D 1/06 224/517 |
| 5,026,016 A * | 6/1991 | Lisowski | ................. | F16B 21/09 248/225.11 |
| 5,244,300 A * | 9/1993 | Perreira | ................ | E04B 1/2403 403/381 |
| 6,109,461 A | 8/2000 | Kluge | | |
| 6,481,679 B1 * | 11/2002 | Bennett | ................ | A61G 13/101 248/223.41 |
| 7,172,164 B2 * | 2/2007 | Fuelling | ................ | A01K 97/10 248/309.1 |
| 2005/0085123 A1 * | 4/2005 | Moscovitch | ......... | H01R 13/627 439/532 |
| 2005/0103959 A1 * | 5/2005 | Lee | ......................... | B63C 11/18 248/223.41 |
| 2005/0127017 A1 | 6/2005 | Kessel | | |
| 2012/0104200 A1 | 5/2012 | Grady | | |
| 2012/0125873 A1 * | 5/2012 | Walz | ..................... | A47B 96/066 211/134 |
| 2013/0182381 A1 * | 7/2013 | Gray | ................... | A61M 5/1415 361/679.01 |

* cited by examiner

*Primary Examiner* — Muhammad Ijaz
(74) *Attorney, Agent, or Firm* — Lynch LLP

(57) ABSTRACT

This application describes a coupling mechanism designed to facilitate attachment of cantilevered components to a stable frame. It is contemplated that embodiments of the inventive subject matter can be implemented to couple such accessories as shelves and trays to modular carts where the cart features a single vertical frame from which the accessories must be attached. Embodiments feature a male coupler and a female coupler, where the male coupler has a v-shaped extrusion and the female coupler has a complementary v-shaped intrusion into which the male extrusion fits upon coupling the two together.

9 Claims, 4 Drawing Sheets

V-SHAPED COUPLING SYSTEM

FIELD OF THE INVENTION

The field of the invention is cantilevered shelf coupling systems.

BACKGROUND

The background description includes information that may be useful in understanding the present invention. It is not an admission that any of the information provided in this application is prior art or relevant to the presently claimed invention, or that any publication specifically or implicitly referenced is prior art.

In many industries, there exists a need for easy-to-use, durable carts. For example, in the film industry, carts are needed to hold equipment, computers, notes, etc. Because storage space often comes at a premium, it is desirable for carts to be modular, allowing for cart accessories to be easily attached and detached so they can be stored separately from the cart and also so the cart is not stuck with only a single set of functionalities based on a set of non-removable accessories. One cart design that is particularly good for efficiently using storage space is a cart featuring a main stem or frame with three wheels on legs that can collapse against the frame. But to attach accessories to such a cart, a coupling system is needed that allows for the attachment of cantilevered accessories to the frame of the cart.

Many have worked to develop cantilevered shelving systems that are easy to couple and decouple. For example, U.S. Pat. No. 6,109,461 to Kluge et al. teaches typical cantilevered shelving mechanisms whereby the shelf portion includes a bracket with hooks that fit into slots on a rail. But the system in Kluge et al. is only stable when a second bracket exists with a shelf therebetween, making this solution ill equipped for coupling an accessory to a single vertical frame. US20050127017 to Kessel et al. teaches a similar coupling mechanism and suffers similar shortcomings as a result.

Virtually all modern shelving systems rely on a bracket with hooks on one end that go into receiving slots on a rail. None of these are adept at coupling items to a single, vertical frame, and thus it has yet to be appreciated that a new system can be developed for fast coupling and decoupling of cantilevered accessories to such a frame.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

SUMMARY OF THE INVENTION

The present invention provides apparatuses, systems, and methods directed to coupling systems that can be used to attach cantilevered accessories to a single, vertical frame or stem (or to any other surface or wall). In one aspect of the inventive subject matter, a coupling system is contemplated that includes a male coupler comprising a first surface and an extrusion from that first surface forming a second surface, the extrusion having a left angled edge and a right angled edge forming a v-shape. The left and right angled edges overhang the first surface. The extrusion is wider at the male coupler's top portion than at the male coupler's bottom portion. The system also includes a female coupler having a third surface and an intrusion forming a fourth surface, where the third surface has a second left angled edge and a second right angled edge forming another v-shape that is complementary to (e.g., forms the same angle as) the male coupler's v-shaped extrusion. The second left angled edge and the second right angled edge both overhang the fourth surface. The intrusion is wider at the female coupler's top portion than at the female coupler's bottom portion to facilitate coupling. In some embodiments, to form this wider portion of the intrusion, the intrusion has a third angled surface and a fourth angled surface where the third and fourth angled surfaces form a wider angle than the second v-shape's angle.

In some embodiments, an acute angle exists between the surfaces (e.g., the main surface and the extruded surface) of the male coupler along the angled edges. Similarly, an acute angle can exist between the surfaces of the female coupler's main surface and the intruded surface also along the angled edges.

In some embodiments, upon coupling the male coupler to the female coupler, the male coupler's extruded surface is parallel to the female coupler's intruded surface. In some embodiments, upon coupling the male coupler to the female coupler, the male coupler's extruded surface contacts the female coupler's intruded surface. The male coupler can additionally include through-holes to facilitate attaching one or more accessories to the male coupler, and the female coupler can be coupled with at least one clamp to hold the female coupler to a support frame (e.g., a vertical stem).

In some embodiments, the male coupler includes a hole in its top portion that is sized and dimensioned to receive a pin that passes through the female coupler. Thus, the female coupler can further comprise a pin protruding through the its top portion, where the pin is actuated by a component on the opposite side of the female coupler from the pin. The pin, actuator, and male receiving hole are designed to hold the male coupler in place relative to the female coupler when the pin is actuated to extrude into the hole in the male coupler.

One should appreciate that the disclosed subject matter provides many advantageous technical effects including a system that allows for quickly coupling and decoupling accessories from a single vertical frame without compromising stability or ease of use.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
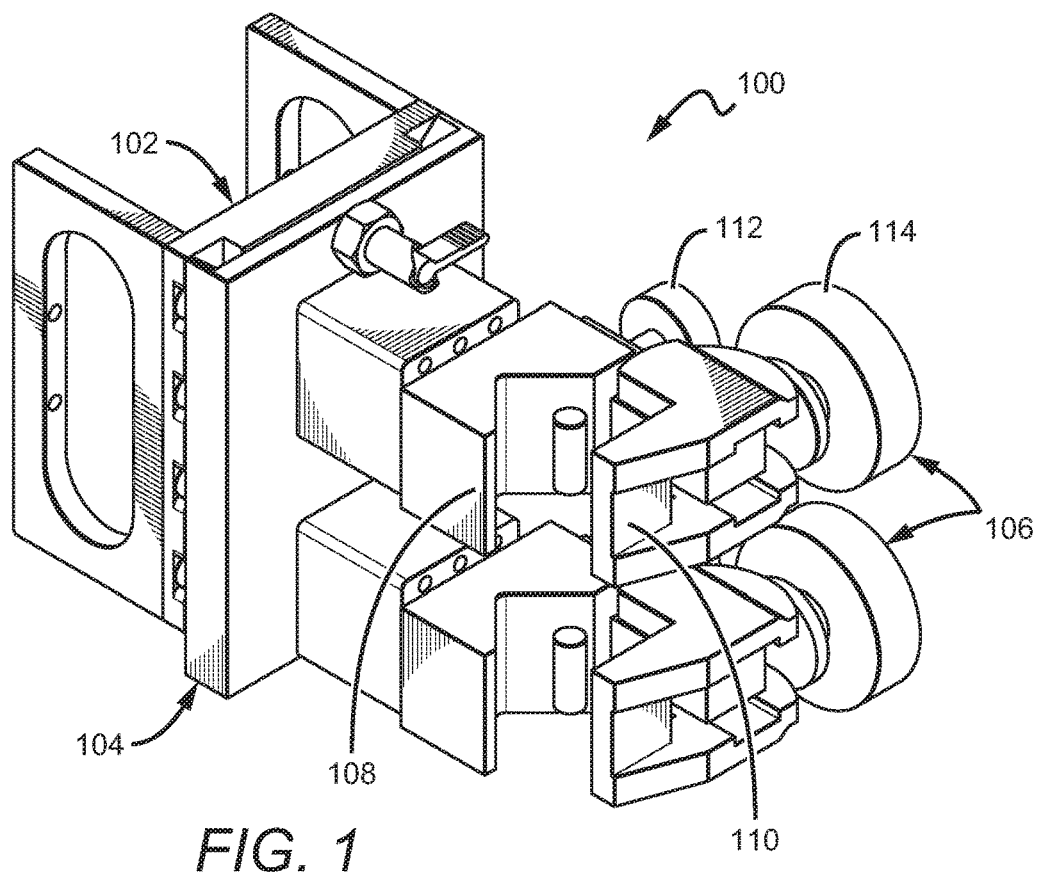
FIG. 1 is an angled view of a coupling system with brackets and clamps.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

The inventive subject matter of this application is directed to a quick-coupling and quick-releasing coupling mechanism that can be used with modular carts but is also widely applicable in other situations calling for a cantilevered component. Embodiments of the inventive subject matter include at least a male coupler and a female coupler that can easily be coupled together. Either the male or female coupler includes hardware to facilitate coupling to a frame, while the other component features hardware to support a cantilevered accessory.

Figure 2:
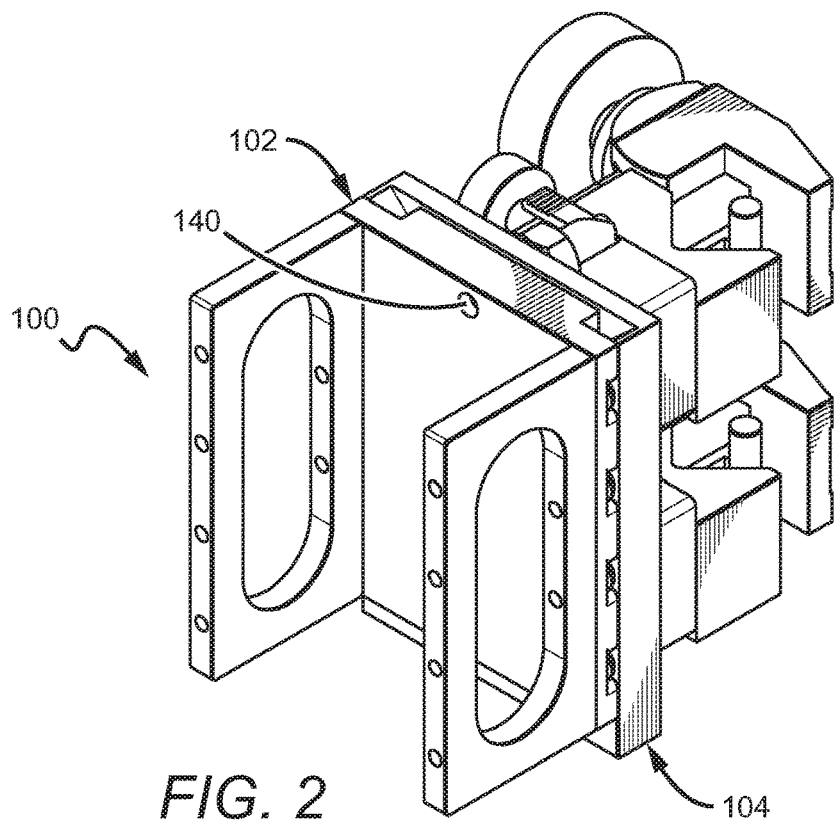
FIG. 2 is a second angled view of a coupling system with brackets and clamps.

FIGS. 1 and 2 show an embodiment of a coupling mechanism 100 of the inventive subject matter. The coupling mechanism 100 includes at least a male coupler 102 and a female coupler 104. In some embodiments (e.g., as seen in FIGS. 1 and 2), the female coupler 104 can have two clamps 106 coupled or affixed to it. A clamp of the inventive subject matter includes a first grip 108, a second grip 110, a first tightening mechanism 112, and a second tightening mechanism 114. Each clamp is configured to couple with, e.g., a frame (e.g., a vertical support structure). The tightening mechanisms enable a user to ensure the clamps are tightly coupled with the frame so that the coupling mechanism 100 cannot slide downward or otherwise experience unwanted movements. Two clamps 106 can be included to improve stability when an accessory is coupled with a coupling mechanism that is in turn coupled to a frame. Because accessories (e.g., shelves, computer keyboard trays, etc.), when coupled to a frame via coupling mechanism of the inventive subject matter, are cantilevered, it is advantageous to ensure stability of the coupled accessory.

Figure 3:
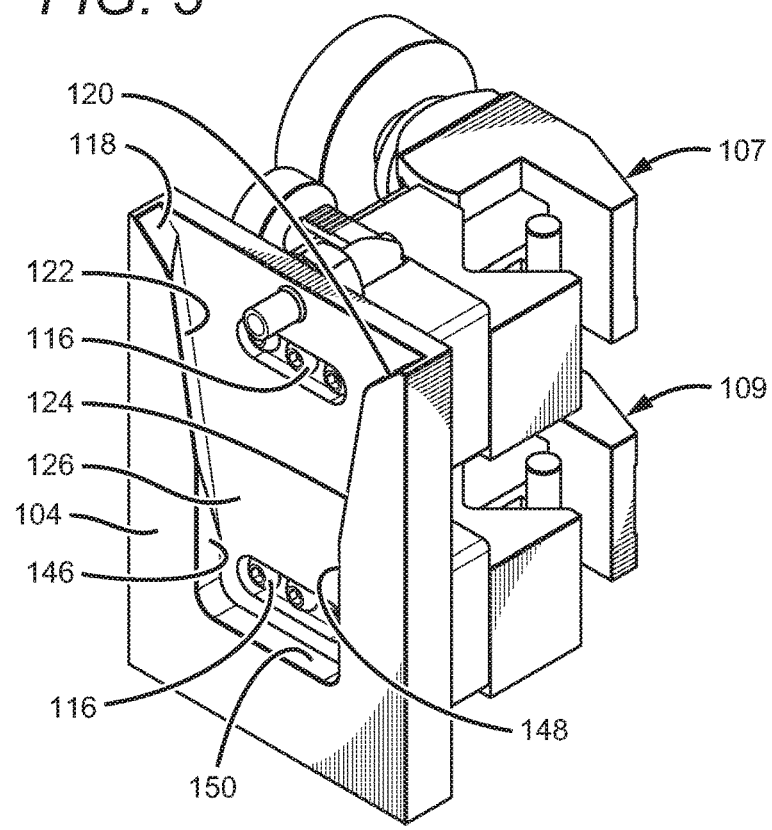
FIG. 3 is an angled view of a female coupler with attached clamps.

Clamps 106 can be coupled with the female coupler 104 using screws 116 as shown in FIG. 3. The top row of screws 116 fasten the top portion of the female coupler 104 to the top clamp 107, while the bottom row of screw 116 fasten the bottom portion of the female coupler 104 to the bottom clamp 109. In some embodiments, the female coupler 104 can be made from the same stock of material as at least the portions of the clamps 106 that couple with the female coupler (e.g., by casting or machining the part).

As seen in FIG. 3, the female coupler 104 comprises a v-shaped intrusion with an opening at the top that is wider than the intrusion is at the bottom. Moreover, the opening at the top of the intrusion includes a left flare 118 and a right flare 120. The flares 118 and 120 are angled outwardly to make the opening at the top of the intrusion wider than it would be if the intrusion followed its angled coupling edges 122 and 124 to the top of the female coupler 104. This makes it easier for the male coupler 102 to be mated successfully with the female coupler 104 as the male coupler has an extrusion that must slide into place so that the male coupler's extrusion is at least partially disposed within the female coupler's intrusion.

The angled coupling edges 122 and 124 are both formed so that material coming from the back surface 126 of the female coupler 104 creates an acute angle with the angled coupling edges 122 and 124. This causes the male coupler 102, when coupled with the female coupler 104, to be held securely in place. Angling can be seen in, e.g., FIG. 3 that shows the left coupling edge 122 with an angled surface connecting down to the back surface 126. The right side is a mirror image of the left side. Thus, angled coupling edges 122 and 124 create angled surfaces for the male coupler's complementary extrusion to fit into and interact with to hold the male coupler 102 against the female coupler 104.

Female coupler 104 additionally includes a portion below the v-shaped portion of the intrusion that has two parallel walls 146 & 148 extending downward from the angled coupling edges 122 and 124. Parallel walls 146 & 148 extend downward to bottom edge 150, creating a space that, upon coupling the male coupler 102 with the female coupler 104, is unoccupied by the male coupler's extrusion. In some embodiments, this space exists so that the bottom screws among the set of screws 116 are lower down on the female coupler 104. This improves the ability of the male and female coupler to hold a cantilevered accessory by making a connection between the female coupler and the clamps stronger. The bottom row of screws can also be used to attach second clamp 109 to the female coupler. In some embodiments, only one clamp is needed, and thus either the top or the bottom row of through-holes remain unused (depending on which row of though holes are used to attach a clamp to the female coupler).

Figure 4:
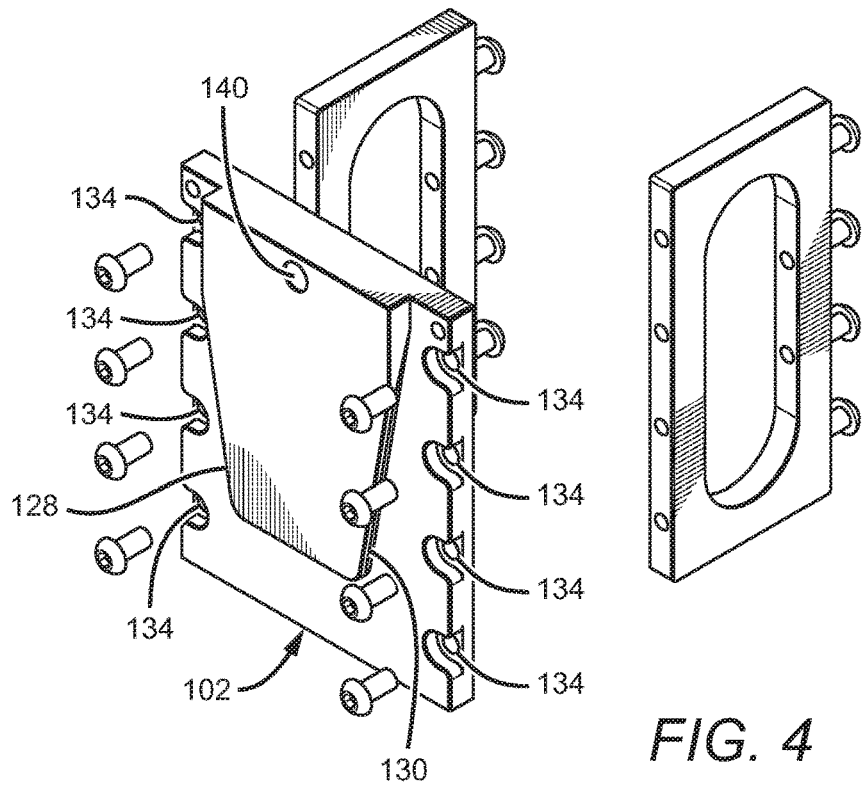
FIG. 4 is a view of a male coupler.

The male coupler 102, as shown in FIG. 4, features a v-shaped extrusion that is complementary to the v-shaped intrusion on the female coupler 104. The female coupler's intrusion thus receives the male coupler's extrusion to couple the two components to one another. To fit the male coupler 102 into the female coupler 104, the male coupler slides into the female coupler such that the wide end of the female intrusion receives the narrow end of the male extrusion. By forming the male and female couplers into complementary "V" shapes, it is thus easier to fit the male coupler into the female coupler to create a cantilevered support for an accessory like a shelf or tray.

Figure 5:
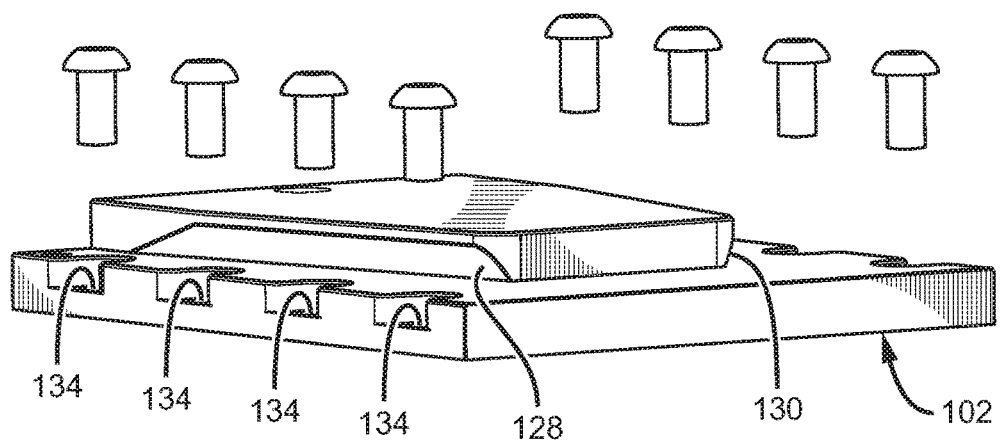
FIG. 5 is another view of the male coupler.

FIG. 5 shows the angled extrusion on the male coupler 102. Both the left side of the extrusion 128 and the right side of the extrusion 130 are similarly angled so that the extrusion can fit within the intrusion on the female coupler 104 such that these angled surfaces interact with complementary angled surfaces forming at least a portion of the female coupler's intrusion to hold the male coupler against the female coupler. Thus, as mentioned above, the intrusion on the female coupler 104 and extrusion on the male coupler 102 are formed into "V" shapes so that it is easier for the male coupler 102 to be couple with the female coupler 104 by sliding the male coupler's v-shaped extrusion into the female coupler's v-shaped intrusion. The male and female couplers mated with one another is shown in FIGS. 1 and 2.

Figure 6:
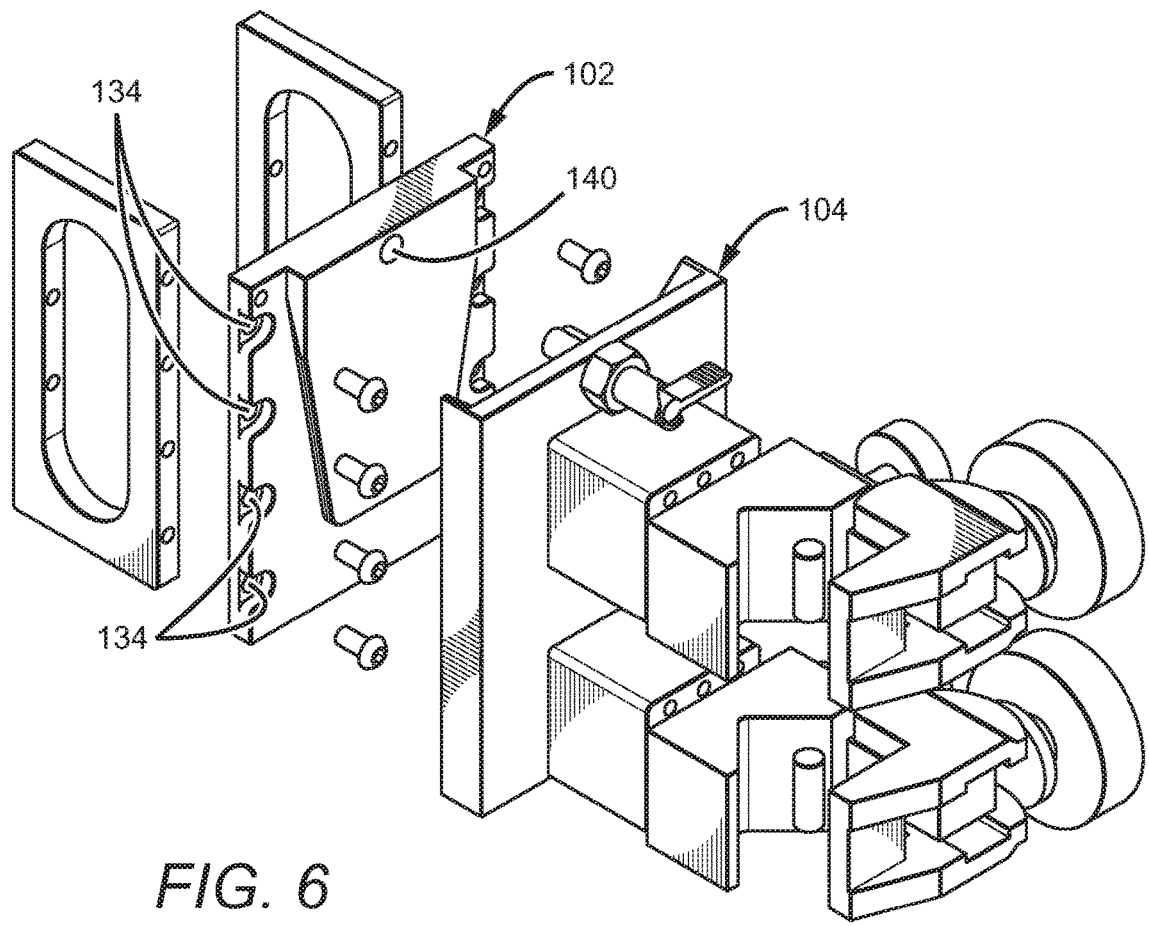
FIG. 6 is a view of the male coupler decoupled from the female coupler.

FIG. 6 shows an exploded view of the male coupler 102, the female coupler 104, along with additional brackets 132 and 134 that can be used to couple accessories to the male coupler. To facilitate coupling accessories (e.g., shelves, keyboard trays, etc.), the male coupler 102 includes a series of through-holes 134 (e.g., screw holes). Through-holes 134 can be arranged according to a standard for certain accessories. It is also contemplated that accessories can be fabricated or otherwise made to include a male coupler built into it, obviating a need for through-holes.

The male coupler 102 shown in the figures includes eight through-holes 134, which are seen most easily in FIG. 4. FIGS. 1-2, 4, and 6-7 additionally show brackets that couple with the male coupler 102 by fasteners (e.g., screws) that pass through the through-holes 134. While the embodiment shown in the figures features brackets 136, any other type of accessory that includes, e.g., threaded holes for screws to tighten into after passing through the through-holes 134 can be coupled with the male coupler 102. For example, accessories such as shelves, trays, and the like can include a set of holes that match all or a portion of the male coupler's through-holes so that the male coupler can be coupled with the accessory and then the accessory can thus be easy coupled and decoupled with a frame via coupling of the male coupler with a female coupler.

Figure 7:
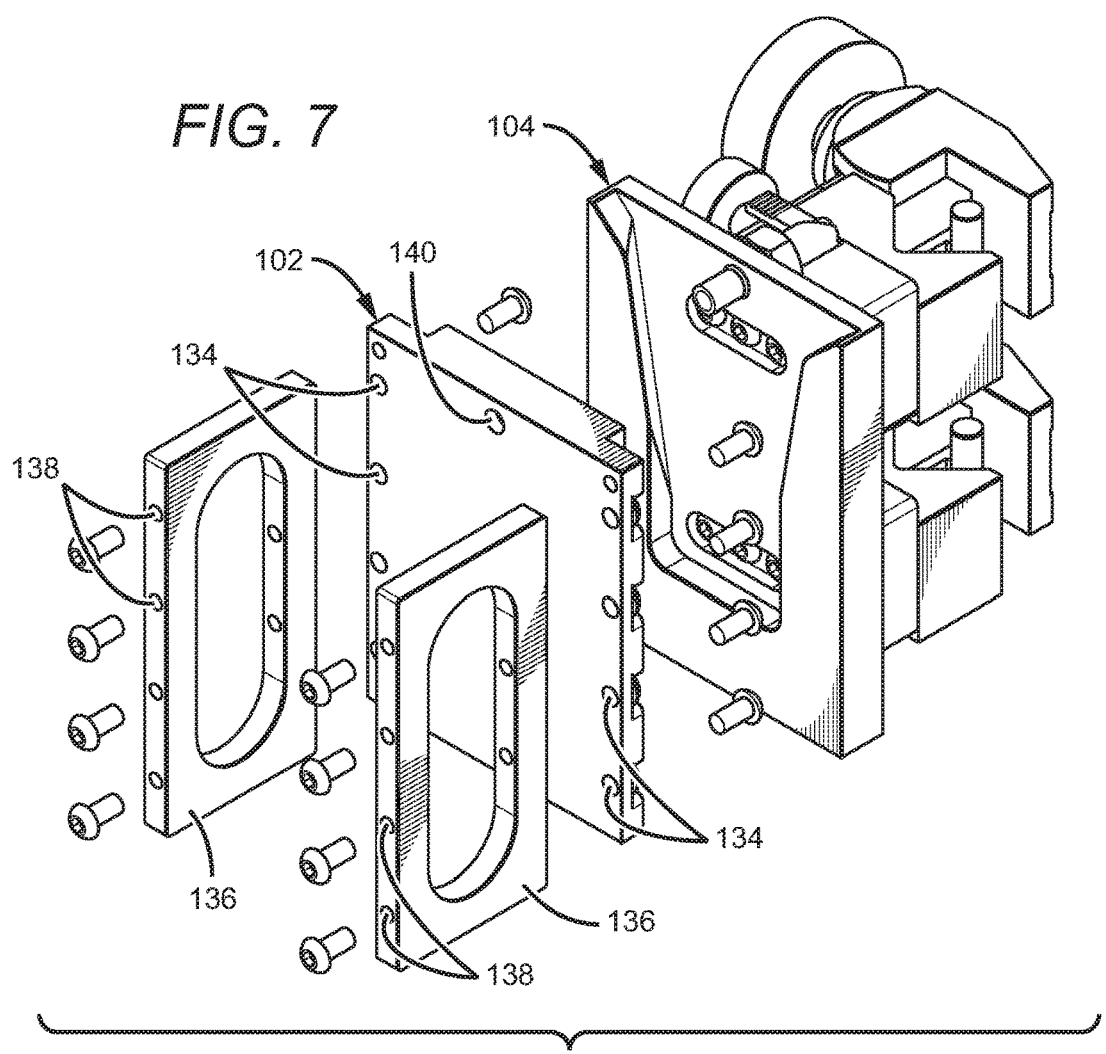
FIG. 7 is another view of the male coupler decoupled from the female coupler.

FIG. 7 shows an alternative view to that of FIG. 6. The male coupler 102 and female coupler 104 are both visible, along with through-holes 134 on the male coupler 102. Brackets 136 are shown featuring holes 138 along an edge, where the holes can be threaded for screws to be tightened into. Thus, the brackets 136 can be used as spacers so that accessories having through-hole patterns matching the holes 136 can be coupled with the brackets 138.

Figure 8:
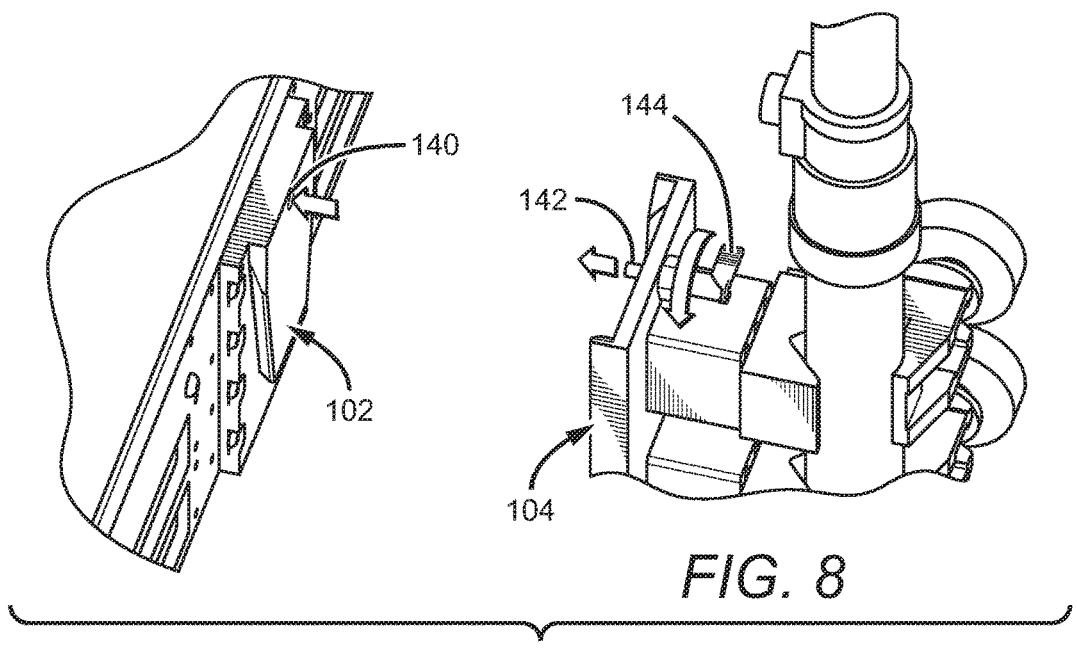
FIG. 8 shows a locking pin mechanism that can hold the male coupler in place when coupled with the female coupler.

FIG. 8 shows a locking mechanism that can be included in some embodiments. As shown throughout the figures, the male coupler 102 includes a hole 140. Hole 140 can be a through-hole as shown in the figures, but this is not a requirement for all embodiments. Hole 140 is sized and dimensioned to receive a pin 142. The locking mechanism includes the pin 142 that protrudes through the female coupler 104 as well as a component 144 on the other side of the female coupler that can be interacted with the manipulate the pin 142.

In the embodiment shown in FIG. 8, turning the component 144 according to the curved arrow causes the pin 142 to move inward or outward (depending on direction of rotation) from the hole in which it resides within the female coupler 104. Thus, the component 144 is turned one direction to fully retract the pin 142 so that the male coupler 102 can be mated to the female coupler 104. Once the male coupler 102 is in place relative to the female coupler (e.g., as shown in FIGS. 1 and 2), the component 144 can again be rotated so that the pin 142 extrudes into the hole 140 in the male coupler 102. This prevents accidentally decoupling of the male coupler 102 from the female coupler 104.

In some embodiments, pin 142 can be spring loaded. In these embodiments, pulling on component 144 compresses a spring while retracting the pin 142. When component 144 is released, the pin 142 is then pushed by the spring back into an extruded position such that the pin 142 can reside within hole 140 on the male coupler 102, thus preventing accidentally decoupling the male coupler 102 from the female coupler 104.

Although embodiments of the inventive subject matter show the male coupler 102 as being the component that accessories can couple to and the female coupler 104 as being the component the clamps 107 and 109 can couple to, it is additionally contemplated that the male and female couplers' positions can be switched. It is within the bounds of the inventive subject matter for the male and female sides (e.g., the intrusion and extrusion) to be interchanged as needed or desired.

Because male and female couplers of the inventive subject matter can be used to facilitate attaching cantilevered accessories to a structure or frame (e.g., a stem, as described above), materials used to create the couplers should be strong enough to support whatever the accessory is. Possible materials include metals, composites, wood, hard plastics, or any combination thereof.

Thus, specific systems directed to quick coupling and quick decoupling systems have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A coupling system, comprising:
   a male coupler comprising a first surface and a protrusion forming a second surface, the protrusion having a left angled edge and a right angled edge forming a first v-shape having a first v-shape angle formed between the left angled edge and the right angled edge;
   wherein the left angled edge overhangs the first surface;
   wherein the right angled edge overhangs the first surface;
   wherein the protrusion is wider at a top portion of the male coupler than at a bottom portion of the male coupler;

a female coupler comprising a third surface and a recess forming a fourth surface, the third surface having a second left angled edge and a second right angled edge forming a second v-shape having a second v-shape angle formed between the second left angled edge and the second right angled edge;

wherein the first v-shape angle is the same as the second v-shape angle;

wherein the second left angled edge overhangs the fourth surface;

wherein the second right angled edge overhangs the fourth surface;

wherein the recess is wider at a top portion of the female coupler than at a bottom portion of the female coupler; and wherein the recess further comprises a third angled surface and a fourth angled surface, wherein the third and fourth angled surfaces form a third v-shape angle that is wider than the second v-shape angle, and wherein the third v-shape angle is less than 180 degrees.

2. The coupling system of claim 1, wherein a first acute angle exists between the first surface and the second surface along the left angled edge, and a second acute angle exists between the first surface and the second surface along the right angled edge.

3. The coupling system of claim 2, wherein a third acute angle exists between the third surface and the fourth surface along the second left angled edge, and a fourth acute angle exists between the third surface and the fourth surface along the right angled edge.

4. The coupling system of claim 1, wherein, upon coupling the male coupler to the female coupler, the second surface is parallel to the fourth surface.

5. The coupling system of claim 1, wherein, upon coupling the male coupler to the female coupler, the second surface contacts the fourth surface.

6. The coupling system of claim 1, wherein the male coupler further comprises through-holes to facilitate affixing one or more accessories to the male coupler.

7. The coupling system of claim 1, wherein the female coupler is coupled with at least one clamp.

8. The coupling system of claim 7, wherein the at least one clamp is configured to tighten around a stem.

9. The coupling system of claim 1, wherein:
the male coupler further comprises a hole in the top portion of the male coupler;
the female coupler further comprises a pin protruding through a top portion of the female coupler that is actuated by a component on an opposite side of the female coupler from the pin; and
wherein the hole is sized and dimensioned to receive the pin such that the pin holds the male coupler and the female coupler in place relative to one another upon actuating the pin while the male coupler is coupled with the female coupler.

\* \* \* \* \*